United States Patent Office
3,459,717
Patented Aug. 5, 1969

3,459,717
SULPHUR-BASED PLASTIC COMPOSITION
Jean-Baptiste Signouret, Billiere, France, assignor to Societe Nationales des Petroles d'Aquitaine Sise: Tour Aquitaine, Courbevoie, France
No Drawing. Filed June 26, 1967, Ser. No. 649,045
Claims priority, application France, June 28, 1966, 67,187
Int. Cl. C08g 33/00
U.S. Cl. 260—79          13 Claims

ABSTRACT OF THE DISCLOSURE

The invention relates to a process for the preparation of a plastic composition, comprising incorporating into molten sulphur, at least one diester of dithiophosphoric acid and at least one ethylenic hydrocarbon and heating the product which is formed until a plastic mass is obtained.

---

The invention relates to a new sulphur-based plastic composition, and also to a process for the preparation of this product. It is concerned more especially with a composeition which is at the same time non-inflammable, sufficiently pliable and capable of adhering to various constructional materials.

On account of their useful properties, particularly for covering floors or other parts of buildings, sulphur-based plastic compositions have numerous applications at the present time. Nevertheless, they have the disadvantage of being inflammable. It has been proposed to add various conventional fireproofing agents and this makes it possible to reduce the combustibility or to prevent the combustion of sulphur compositions, just as with other plastic materials; however, as the quantities of fireproofing agent which have to be employed are relatively high, the problem of compatibility is encountered; in addition, it is necessary that the fireproofed composition shall not lose its plasticity. In the case of certain polymers, particularly vinyl polymers fireproofing agents have been proposed which have, at the same time, a plasticizing effect. However, these adjuvants are fairly complex organic compounds of phosphorus and the preparation thereof is not simple; moreover, even if certain of them are suitable for use with sulphur, the cost thereof would result in the loss of the advantage of remarkable economy which plasticized sulfur compositions possess. The plasticizing fireproofing agents in question are phosephonates or thiophosphonates and halogenated diphosphates containing numerous carbon groups, of which the most simple correspond to the formulae:

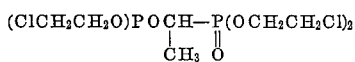

(see French patent specification No. 1,283,882) and

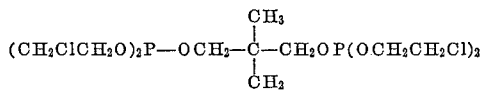

(see French patent specification No. 1,349,088).

The present invention solves the problem in a much simpler, economic manner by the use of organic compounds of phosphorus and sulphur, of which the chemical composition is not at all complicated. The invention results from the quite unexpected discovery that a fireproofing effect is obtained at the same time as an excellent, plasticizing effect when molten sulphur has added thereto at the same time, a certain thio-compound of phosphorus and an ethylenic hydrocarbon, while the use of only one of these adjuvants does not give any such result.

Accordingly the process according to the invention consists in incorporating into molten sulphur, at least one diester of dithiophosphoric acid and at least one ethylenic hydrocarbon, and heating the product formed until a plastic composition is obtained.

The diesters which are suitable for carrying out the invention can be represented by the formula:

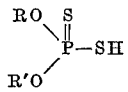

in which R and R', which may be the same or different, represent alkyl, aryl, aralkyl and/or cycloalkyl radicals, including substituted alkyl, aryl, aralkyl and/or cycloalkyl radicals as set forth hereinafter. Preferably, whatever the nature of these radicals, their molcular weight exceeds 50. Thus, although these radicals can be methyl, ethyl or propyl radicals it is preferable for them to be butyl, isobutyl, tert-butyl or pentyl radicals, and especially heavy alkyl radicals, such as hexyl, heptyl, octyl, dodecyl, octadecyl . . . etc. In general terms, in the case of the alkyl diesters, each of the alkyl radicals may have for example, 1 to 30 carbon atoms and preferably 4 to 24 carbon atoms.

Also suitable are diesters of dithiophosphoric acid in which the radicals R and R' are cycloalkyl radicals, particularly cyclopentyl and cyclohexyl, optionally with such substituents as halogen or alkyl radicals; the substituted radicals which may be employed include, for example, methyl-cyclohexyl, methyl-cyclopentyl, methyl-cyclobutyl, chloro-cyclohexyl and dibromo-cyclohexyl.

Particularly favorable results are obtained with aryl diesters, that is to say diesters in which the radicals R and R' are aromatic. Diphenyl dithiophosphate, which is the most common of these substances and the most economic, gives excellent results. One or both of the phenyls may be replaced by chlorophenyl, tolyl, chloro-tolyl, dichloro-tolyl, xylyl, chloroxylyl, benzyl, bromobenzyl or naphthyl, all of which may optionally be halogenated, and also by phenyls carrying one or more alkyl substituents, especially ethyl, propyl, isopropyl, n-butyl, isobutyl or tert-butyl substituents; diphenyl, chlorodiphenyl and other substituents are also possible.

The dithiophosphoric diesters which may be used in carrying the invention into effect also include mixed esters; in this case, if one of the radicals R or R' is for example an aryl radical, the second will be alkyl or cycloalkyl. Diesters of this type include the following dithiophosphates: phenyl-butyl, xylyl-propyl, phenyl-dodecyl, cyclohexyl-tolyl and cyclopentyl-decyl, for example.

With regard to methods of preparing the diesters of dithiophosphoric acid, one good process consists in causing an alcohol or phenol, or a mixture of the two, to react with phosphorus pentasulphide under heat. Thus, for example, by heating 1 mol of $P_2S_5$ with 4 mols of $C_6H_5OH$ at 170° C. for 2 hours, diphenyl dithiophosphate $(C_6H_5O)_2PS$—SH is obtained in substantially theoretical yield. The following working method can be successfully applied: Into a reaction vessel containing 9.4 kg. of phenol and 5.5 kg. of $P_2S_5$ in powder form, nitrogen is fed in order to drive off the air, and then the vessel is moderately heated while stirring; the temperature is raised to 170° and is kept at this value for 2 hours, after which it is allowed to fall towards 100° C. and filtration takes place; 14 kg. of a product crystallizing at 20° C. are obtained. On analysis, this product has a content of 10.1% phosphorus and 21% of sulphur, as compared with a theoretical content of 10.9% and 22.7%, respectively; its acid index is 200 mg. of KOH/g., which is almost the theoretical value (199 mg./g.).

The second constituent of the composition according to the invention, the ethylenic hydrocarbon, is preferably an aryl-alkene, and particularly an aryl-vinyl compound. The most common substance of this kind, which gives excellent results, is styrene, but other aryl-alkenes with one or more benzene rings can be employed when it is desired to modify to a greater or lesser extent the properties of the sulphur-based plastics composition. Particularly suitable are such compounds as α-methyl-styrene, α-chlorostyrene, dichlorostyrenes, fluorostyrenes, methyl-chlorostyrenes, dimethylstyrene, particularly 2,5-dimethyl-styrene, ethylstyrene, trifluoromethyl-styrenes, isopropenyl toluene, α- or β-vinyl naphthalene or chloronaphthalene, vinylacenaphthene and vinylfluorene for example.

It is obvious that the compositions of the invention can be prepared using several dithiophosphoric diesters at the same time, and/or several ethylenic hydrocarbons, incorporated into the same portion of molten sulphur.

The relative proportions of the three types of constituents of the composition according to the invention can vary fairly widely, but the proportions giving the products which are the most interesting from the industrial point of view are within the limits (by weight) of 40 to 98 parts for the sulphur, from 30 to 1 parts for the dithiophosphoric diester or diesters and from 30 to 1 parts of the ethylenic hydrocarbon or hydrocarbons, the ratio by weight of diester to hydrocarbon being about 0.2 to 5. The best results are obtained with 70 to 90 parts of sulphur and 5 to 15 parts of each of the other two constituents, the ratio between diester and hydrocarbon being about 0.2 to 5 and preferably 0.5 to 1.5.

As the new composition is prepared from molten sulphur, the working temperature must be at least about 115° C., taking into account the lowering of the solidification point of the sulphur (119–120° C.) due to the presence of the adjuvant. Generally speaking, it is possible to use temperatures from 115° C. to about 200° C., the heating period being longer as the temperature is lower, it being possible for the heating periods to range between 5 minutes and 12 hours. However, it is preferable to operate at temperatures between 130° and 180° or better still, between 140° and 170°, possibly under pressure. At these latter temperatures, the operation can be carried out in about half an hour to 2 hours.

The adjuvants according to the invention can be incorporated into the sulphur simultaneously or in succession and the addition can take place in one or two steps, or possibly in a continuous operation.

According to one quite unexpected effect of the invention, the method of introducing the adjuvants into the sulphur affects the heat stability which is desired for the product to be prepared: It is in fact found, quite surprisingly, that the time after which the compositions according to the invention assume a deeper coloring under the action of heat depends on the order in which the adjuvants are added. Thus, for the same percentage composition and the same average heating temperature, the product becomes brown less rapidly if the dithiophosphoric ester is heated with the sulphur before the addition of the hydrocarbon; the standard used for the purpose of color comparison is the color which is developed when the product is kept at 130° in the presence of air in a stainless steel container.

Thus, the process of the invention can be carried out in the following ways, all of which lead to the formation of plastic compositions which are suitable for the same applications.

The first procedure consists in adding to the sulphur, first of all, the desired quantity of dithiophosphoric diester, and in heating the combination at a temperature between 115° and 200° C. for between, respectively, 10 hours and 5 minutes, and preferably at a temperature between 130° and 180° C. for from 2 hours to half an hour, under pressure if the vapor pressure of the diester requires this; obviously when working under atmospheric pressure, the temperature for initiating heating is chosen as a function of the boiling point of the diester used, so as to avoid volatilization of the latter. The hydrocarbon is then added in the desired quantity and heating is carried out at between 115° and 200° C. for from 10 hours to 5 minutes, and preferably at between 130° and 170° C. for from 2 hours to half an hour; the same precautions are taken, as above, as regards the temperature to be applied; when the hydrocarbon is relatively volatile, heating takes place first of all at a relatively low temperature, which is then progressively raised.

In contrast to the foregoing, a second procedure consists in first of all adding the desired quantity of hydrocarbon, next heating the combination to a temperature of the same order as above and then adding the necessary quantity of dithiophosphoric diester. After further heating of adequate duration, the plastic composition is finally obtained, as in the preceding case, but it is found that it has a tendency to turn brown slightly more quickly when it is subjected to oxidizing heating at 130° C.

A third procedure consists in repeating the operations described in the two preceding methods a certain number of times, in succession and intermittently.

In another procedure according to the invention, the two adjuvants are added at the start to the liquid sulphur; heating first of all takes place at a moderate temperature, at which none of the constituents is capable of vaporizing; the temperature is then raised to about 150° to 200° C. and the process is continued as in the preceding procedures.

Finally, it is also possible to introduce the two adjuvants into the molten sulphur simultaneously or in succession, in continuous manner, the sulphur being kept at the appropriate temperature.

In all cases, a non-inflammable, homogeneous product is obtained, which is yellow in color and the non-inflammability of which can be demonstrated by tests carried out according to ASTM Standard No. D 635–63. This test consists in subjecting a fragment of plasticized sulphur to the action of a flame from a gas burner supplied with natural gas; the plasticized sulphur melts and flows without burning; the non-inflammability is confirmed by the absence of any release of sulphur dioxide.

The new plastic compositions according to the invention have numerous applications; they can in particular be employed as paving or wall materials and they can be colored by means of an appropriate coloring agent or pigment. One important application is the laying of traffic marking lines or strips on bituminous or concrete roadways; these materials adhere for one year without flaking, despite heavy traffic; for this use, they can be employed alone or with balls of special glass for increasing the reflection power. When the lines or bands are applied a special machine can be employed for sprinking the latter together with balls of plastic material or of natural or synthetic rubber, these improving the running properties and the coefficient of friction. It is also possible to use the materials provided by the invention as an actual road covering by direct pouring, possibly in admixture with said and/or gravel. The products can also be used to form tight joints. In general terms, the products according to the invention are suitable for all the uses for which sulphur-based plastic compositions have been employed hitherto, but they have in addition the advantage of being non-inflammable.

The examples given below are intended to illustrate the invention, without limiting the scope thereof as defined by the appended claims. In these examples, the adjuvants used are, respectively, the phenyl diester of dithiophosphoric acid and styrene.

EXAMPLES 1 TO 4

First of all, the diester is added to molten sulphur and these are heated to a temperature which is between 150° and 170° C.; after heating for about 1 hour, the styrene is added in its turn, after which heating takes place for a certain period, which is generally of the order of 1 to 2 hours, at a temperature from 140° to 155° C.

The quantities of materials used, the temperatures applied and the heating periods are indicated in the table which follows.

In all four cases, plastic materials are obtained which are of excellent quality, adhere very well to constructional materials and are non-inflammable.

When subjected to the heating test in an atmosphere of air at 130° C. in a stainless steel container, these products started to turn brown to an appreciable extent only after 24 hours.

EXAMPLES 5, 6 AND 7

In these examples, the first adjuvant introduced into the sulphur was the styrene and not the diester. After the introduction thereof, heating took place for about 1 hour at a relatively low temperature compared with Examples 1 to 4, in particular about 130° to 140° C., in order to avoid evaporation of the styrene, which boils at 145° C.

The diester was added after this first heating phase, and heating was continued for one or two hours, at a temperature of the order of 150° to 170° C.

The products thus obtained had the same characteristics, and were suitable for the same applications, as the products of Examples 1 to 4; browning thereof, under the same test conditions as indicated above, commenced after 16 hours.

The numerical data concerning these 3 examples are given in the same table as those of Examples 1 to 4.

EXAMPLES 8 TO 10

The procedure used in these three examples was that of the simultaneous addition of the dithiophosphoric diester and styrene to sulphur.

The working conditions are indicated later in the general table.

The products obtained have the same characteristics of plasticity, homogeneity and inflammability as those of Examples 1 to 7.

EXAMPLE 11

The total proportions are the same as for Examples 2 to 6, but the adjuvants are incorporated intermittently, in several steps. The operation includes four stages each comprising addition and heating:

1st—diester—heating for half an hour at from 140° to 155° C.

2nd—styrene—heating for half an hour at from 140° to 155° C.

3rd—diester—heating for half an hour at 140° C.

4th—styrene—heating for half an hour at from 140° to 170° C.

The numerical details are given hereinafter in the table. Plastic compositions are obtained which are similar to the compositions obtained in the preceding examples.

The heat stability is similar to that of the products of Examples 1 to 4.

Table

DPD—indicates the phenyl diester of dithiophosphoric acid;

STY—indicates styrene;

S—indicates sulphur;

The temperatures and heating periods are indicated for each adjuvant, in the order in which they are added.

COL—indicates the time after which under test at 130° in air, a browning effect is observed.

Drying—indicates the time after which the plastic composition is no longer tacky when poured with the layer thickness indicated in millimeters.

TABLE

| | Weight in kg. | | | | Heating (hrs.) | COL | |
|---|---|---|---|---|---|---|---|
| | S | DPD | STY | Operating procedure, ° C. | | Hours | Drying |
| Example: | | | | | | | |
| 1 | 90 | 5 | 5 | (1) DPD, 150°–160° C.<br>(2) STY, 140°→160° | 1<br>1 | 24 | 5 min./1 mm. |
| 2 | 80 | 10 | 10 | (1) DPD, 170°<br>(2) STY, 140°→155° C. | 1<br>1 | 24 | 24 h./10 mm. |
| 3 | 70 | 15 | 15 | (1) DPD, 170°<br>(2) STY, 140°→155° | 1<br>1 | 24 | 76 h./10 mm. |
| 4 | 85 | 5 | 10 | (1) DPD, 150°–160°<br>(2) STY, 140°→150° | 1<br>2 | | 30 min./1 mm. |
| 5 | 90 | 5 | 5 | (1) STY, 130°–140°<br>(2) DPD, 150°–160° | 1<br>1 | 16 | 6 min./1 mm. |
| 6 | 80 | 10 | 10 | (1) STY, 130°–140°<br>(2) DPD, 170° | 1 | 16 | 24 h./10 mm. |
| 7 | 85 | 5 | 10 | (1) STY, 130°–140°<br>(2) DPD, 140°–160° | 1<br>2 | | 40 min./1 mm. |
| 8 | 90 | 5 | 5 | Simultaneously, 140°/20 min.–160° | 1 | | |
| 9 | 70 | 15 | 15 | Simultaneously, 140°/30 min.–170° | 2 | | |
| 10 | 75 | 10 | 15 | do | 2 | | |
| 11 | 80 | 5<br><br>5<br> | <br>5<br><br>5 | (1) DPD, 140°–155<br>(2) STY, 140°–155°<br>(3) DPD, 170°<br>(4) STY, 140°–170° | ½<br>½<br>½<br>½ | 24 | |

EXAMPLES OF APPLICATION.—EXAMPLE 12

(A) Each of the products obtained according to Examples 1, 5, 8 and 11 is remelted, and 1.75% by weight of cadmium yellow is added thereto, this being intimately dispersed in the composition. The liquid composition is then applied in the form of marking bands on a bitumen road surface, by means of a spraying machine; by spraying an identical application is carried out on a concreted area.

In both cases, excellent adhesion and good resistance to the wear caused by the tyres of vehicles running on the test surfaces are found; the results are the same for the four products.

(B) Other similar tests are carried out with the same compositions, the bands or strips being sprinkled with glass balls in order to increase the coefficient of friction. The balls are well held into the composition.

EXAMPLE 13

The compositions of Examples 1, 2, 4, 5, 7, 8 and 11 are each loaded at between 140° and 150° with 10% of glass fiber, and the coatings thus prepared are applied under heat to concrete and brick walls. In all cases, the adhesion on the walls is very good; only the drying periods differ substantially, within the ranges indicated in the column headed "drying' 'of the preceding table. The coatings are non-inflammable and are resistant to the effects of weather and to the action of sulphur dioxide. The glass fiber filling greatly increases the shock resistance.

EXAMPLE 14

Each of the compositions of Examples 1 to 11 is mixed at about 140° C. with, per 100 kg. of the plastic composition, 80 kg. of dry sand and 320 kg. of dry stone chips, of varying sizes as used for concrete mixes. Part of the mixture obtained is poured on to a floor and part into shuttering reinforced with iron or steel rods; very resistant compositions are thus obtained, which do not catch fire, even in contact with burning gasoline. The reinforced compositions adhere very strongly to the rods; they do not allow either water or conventional organic solvents to pass through.

I claim:

1. A process for the preparation of a sulphur-based plastic consisting essentially of the reaction product of sulphur, a diester of dithiophosphoric acid, and an ethylenic hydrocarbon which comprises:
   (a) incorporating into 40 to 98 parts by weight of molten sulphur, from 1 to 30 parts by weight of a monoethylenically unsaturated hydrocarbon, and from 1 to 30 parts by weight of at least one diester of dithiophosphoric acid having the formula

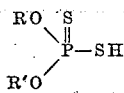

wherein R and R' are each alkyl, aryl, aralkyl, or cycloalkyl radicals, each of said R and R' groups having a molecular weight in excess of 50; and
   (b) heating the resulting mixture at temperatures within the range of 15° to 200° C. to produce the desired sulphur-based plastic composition.

2. The process of claim 1 wherein the dithiophosphoric acid diester comprises at least one aryl or aralkyl radical derived from benzene or naphthalene.

3. The process of claim 2, in which the dithiophosphoric acid diester is a phenyl diester.

4. The process of claim 1 wherein the monoethylenically unsaturated hydrocarbon is an aryl vinyl compound.

5. The process of claim 4 wherein the aryl vinyl compound is selected from the group consisting of styrene, an alkyl styrene, and a halo-styrene.

6. The process of claim 1, wherein the weight ratio of dithiophosphoric acid diester and the monoethylenically unsaturated hydrocarbon is from 0.2 to 5.

7. The process of claim 1, in which from 5 to 15 parts by weight of the monoethylenically unsaturated hydrocarbon and from 5 to 15 parts by weight of the diester of dithiophosphoric acid are incorporated into from 70 to 90 parts by weight of the molten sulphur.

8. The process of claim 1 wherein the reaction mixture is heated in step (b) for from 5 minutes to 12 hours.

9. The process of claim 1 wherein the diester is initially added to the molten sulphur, the resulting mixture is heated, the unsaturated hydrocarbon is then added thereto, and the resulting mixture is then heated as set forth in step (b).

10. The process of claim 1 wherein the unsaturated hydrocarbon is initially added to the molten sulphur, the resulting mixture is heated, the diester is then added thereto, and the resulting mixture is then heated as set forth in step (b).

11. The process of claim 1, wherein the diester and the unsaturated hydrocarbon are simultaneously incorporated with the molten sulphur prior to heating the reaction mixture as set forth in step (b).

12. The process of claim 1 wherein the diester and the unsaturated hydrocarbon materials are added to the molten sulphur while maintaining the mixture thereof at temperatures below the boiling points of such materials and the temperature of the resulting reaction mixture is thereafter progressively increased within the range set forth in step (b).

13. The sulphur-based plastic composition prepared by the process of claim 1.

References Cited

UNITED STATES PATENTS

| | | | |
|---|---|---|---|
| 2,989,513 | 6/1961 | Henry et al. | 260—79 |
| 3,261,804 | 7/1966 | Graham | 260—79 |
| 3,342,620 | 9/1967 | Molinet et al. | 106—287 |
| 3,058,941 | 10/1962 | Birum | 260—30.6 |
| 3,124,556 | 3/1964 | Merrifield et al. | 260—45.7 |

DONALD E. CZAJA, Primary Examiner

M. I. MARQUIS, Assistant Examiner

U.S. Cl. X.R.

106—287; 260—30, 41, 45